Sept. 15, 1959  A. ROTH  2,904,023
PISTON TYPE INTERNAL COMBUSTION ENGINE
Filed June 14, 1957  5 Sheets-Sheet 2

Inventor:
Adolf Roth
By
Patent Agent

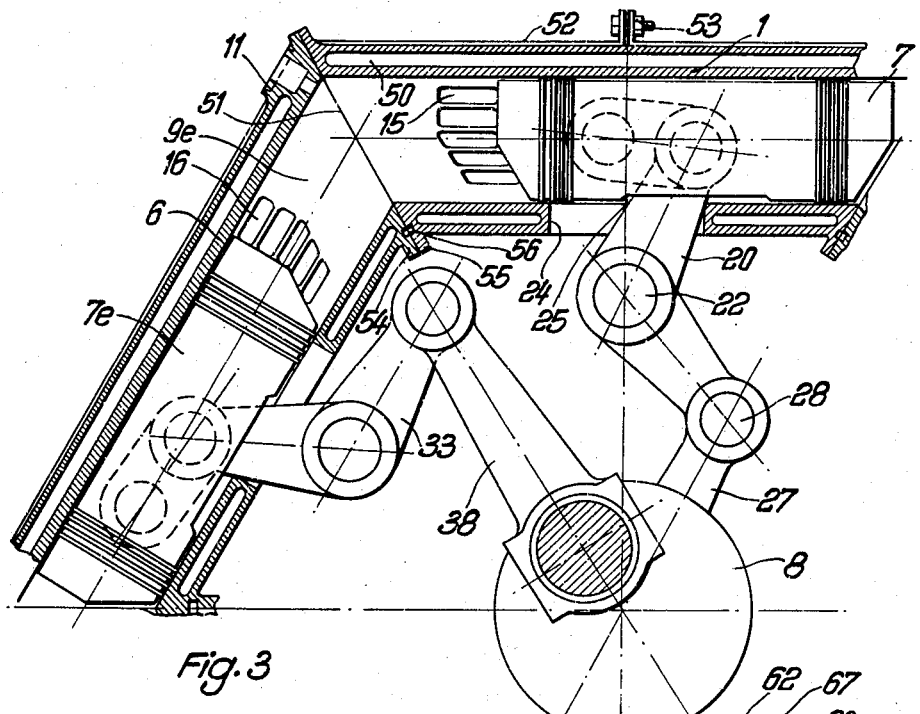
Fig. 3
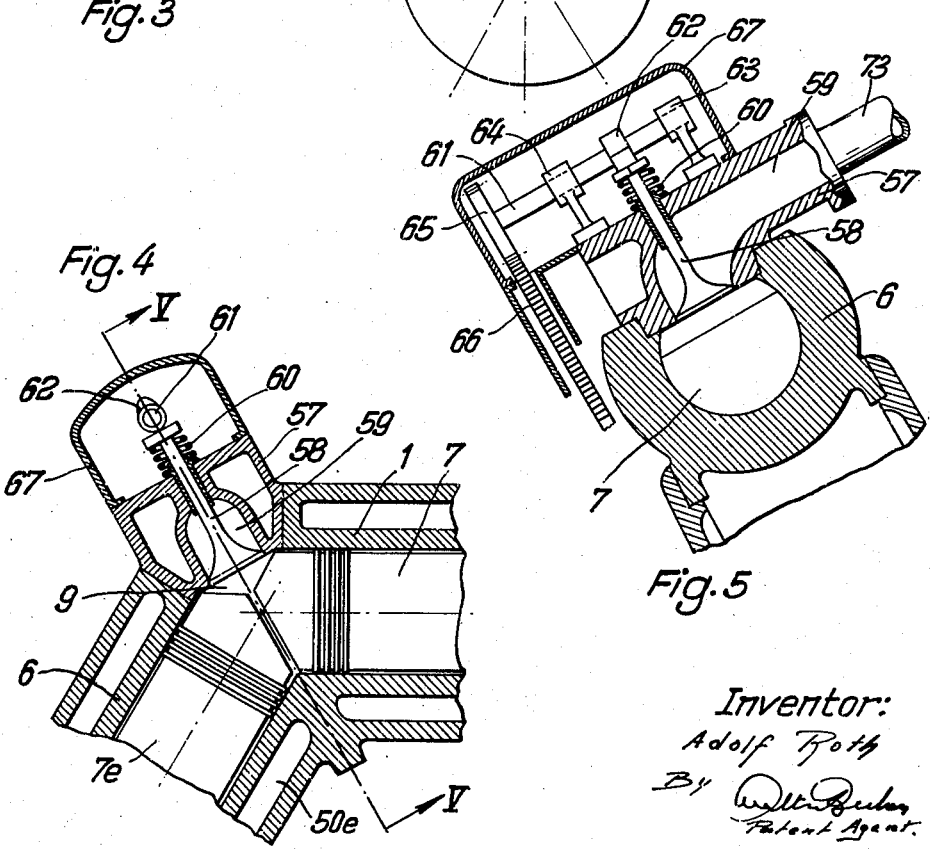
Fig. 4
Fig. 5
Inventor:
Adolf Roth

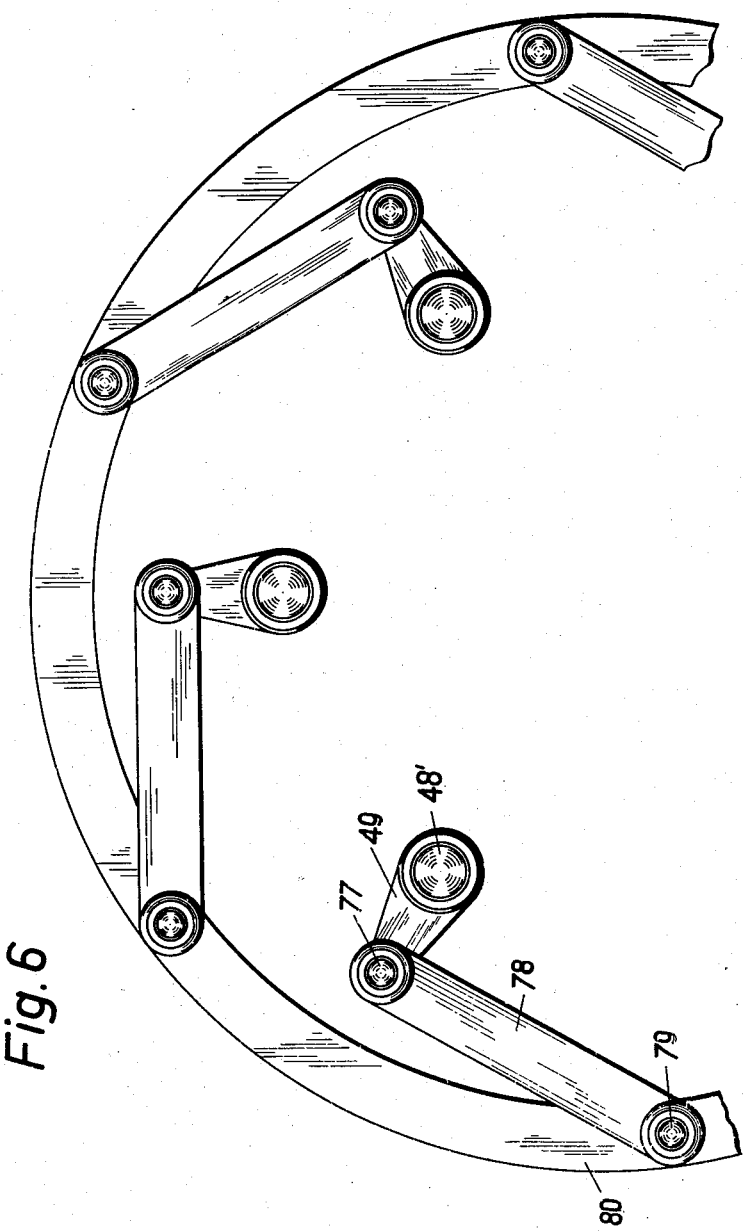

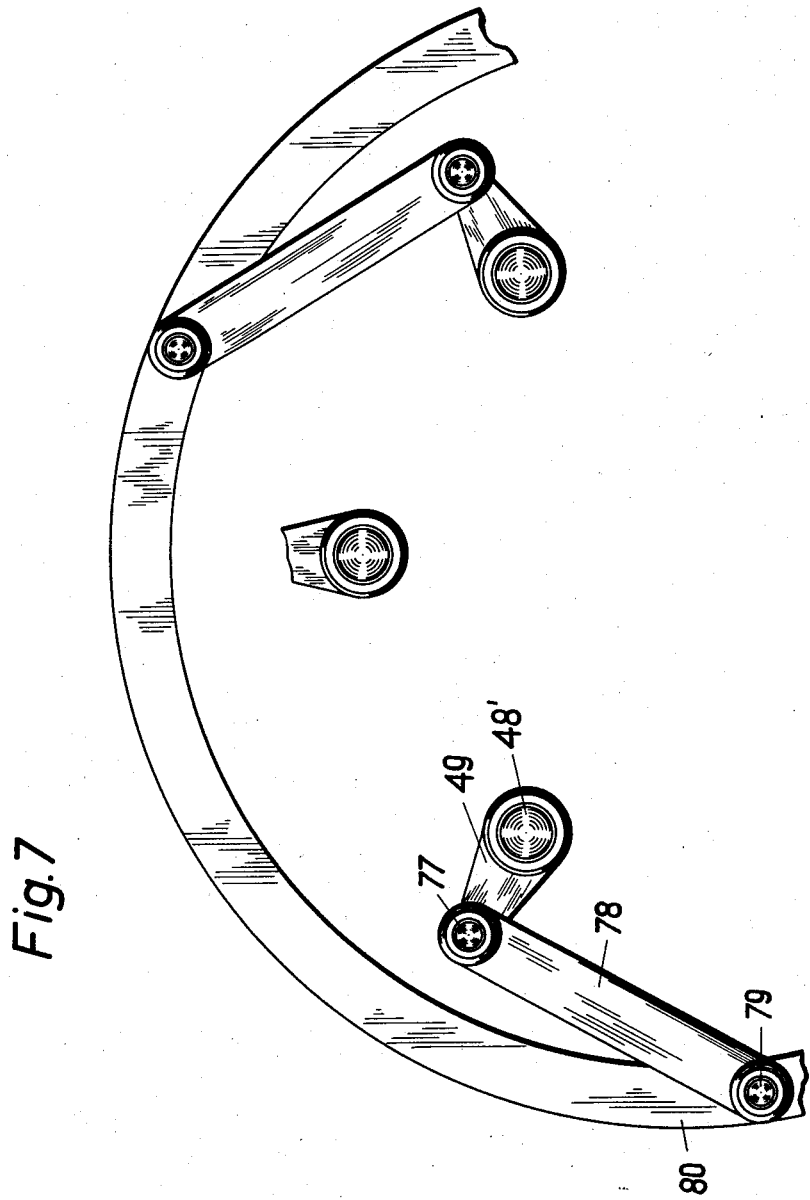

United States Patent Office 2,904,023
Patented Sept. 15, 1959

2,904,023

PISTON TYPE INTERNAL COMBUSTION ENGINE

Adolf Roth, Essen, Germany

Application June 14, 1957, Serial No. 665,771

Claims priority, application Germany, June 18, 1956

7 Claims. (Cl. 123—48)

The present invention relates to piston type internal combustion engines and, more particularly, to engines of this type in which the cylinders form the sides of a polygon. With a heretofore known internal combustion engine of the above mentioned type, the cylinders are arranged relative to each other in form of a triangle, while auxiliary crank shafts respectively arranged at each corner of the triangle jointly actuate a main crank shaft common to all of said auxiliary crank shafts. Such engine having a high output while requiring small space and being of low weight only has the drawback that it is rather expensive in view of the number of crank shafts required. Moreover, overhauling operations are relatively complicated and can be carried out by specially skilled mechanics only.

It is, therefore, an object of the present invention to provide a polygon type internal combustion engine which while maintaining the advantages of the heretofore known polygon type internal combustion engine will not have the drawbacks thereof.

It is another object of this invention to provide a polygon type internal combustion engine in which no crank shafts at the corners of the polygon engine unit will be necessary.

It is still another object of this invention to provide a polygon type internal combustion engine of the character set forth in the preceding paragraphs, which will be relatively simple in construction and operation and will be relatively inexpensive.

These and other objects and advantages of the invention will appear more clearly from the following specification in connection with the accompanying drawings, in which:

Fig. 3 illustrates on a somewhat larger scale than Fig. 1 the left-hand upper portion of Fig. 1.

Fig. 4 illustrates in section a corner of the polygon type engine according to the invention in combination with a valve for controlling the discharge of the combustion gases.

Fig. 5 is a section taken along the line V—V of Fig. 4.

Fig. 6 shows a portion of a control link system interconnecting all control levers for changing the opening time of the inlet and outlet slots of the engine illustrated in Fig. 1.

Fig. 7 is a modification of the control link system of Fig. 6, according to which only the control levers pertaining to every second piston are interconnected.

*General arrangement*

A polygon type internal combustion engine according to the present invention is characterized primarily in that double acting pistons are respectively provided in a plurality of cylinders arranged relative to each other so as to define a polygon and that at each corner of said polygon where each two adjacent cylinders meet, the latter confine with each other compression and working chambers for the pistons reciprocably arranged therein. The polygon type internal combustion engine according to the invention furthermore comprises a plurality of lever and link systems which operatively connect the respective pistons with a substantially centrally located crank shaft for conveying the piston forces thereto.

*Structural arrangement*

Figure 1:
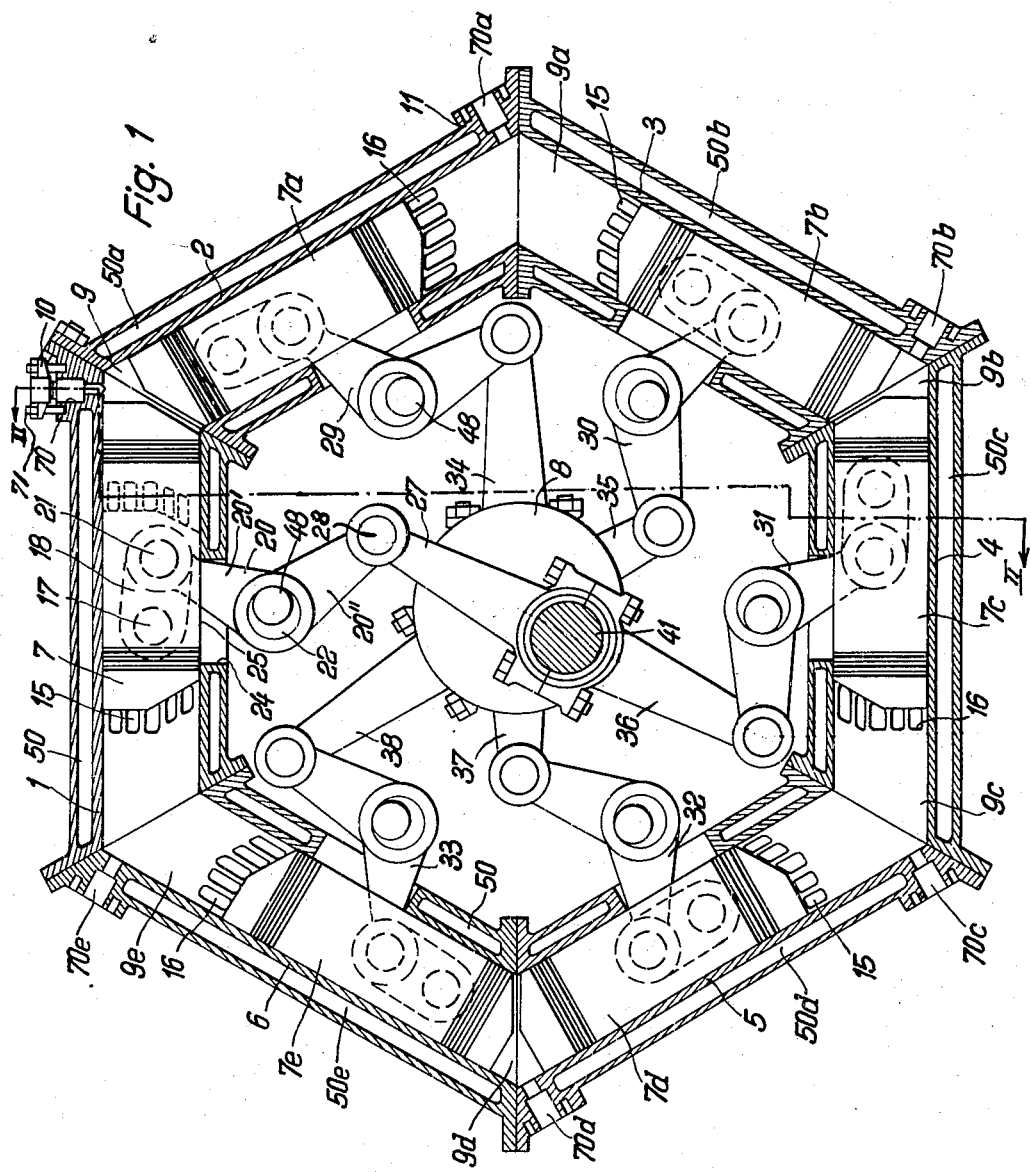
Fig. 1 represents partially in section an embodiment of a polygon type internal combustion engine according to the present invention.
Figure 2:
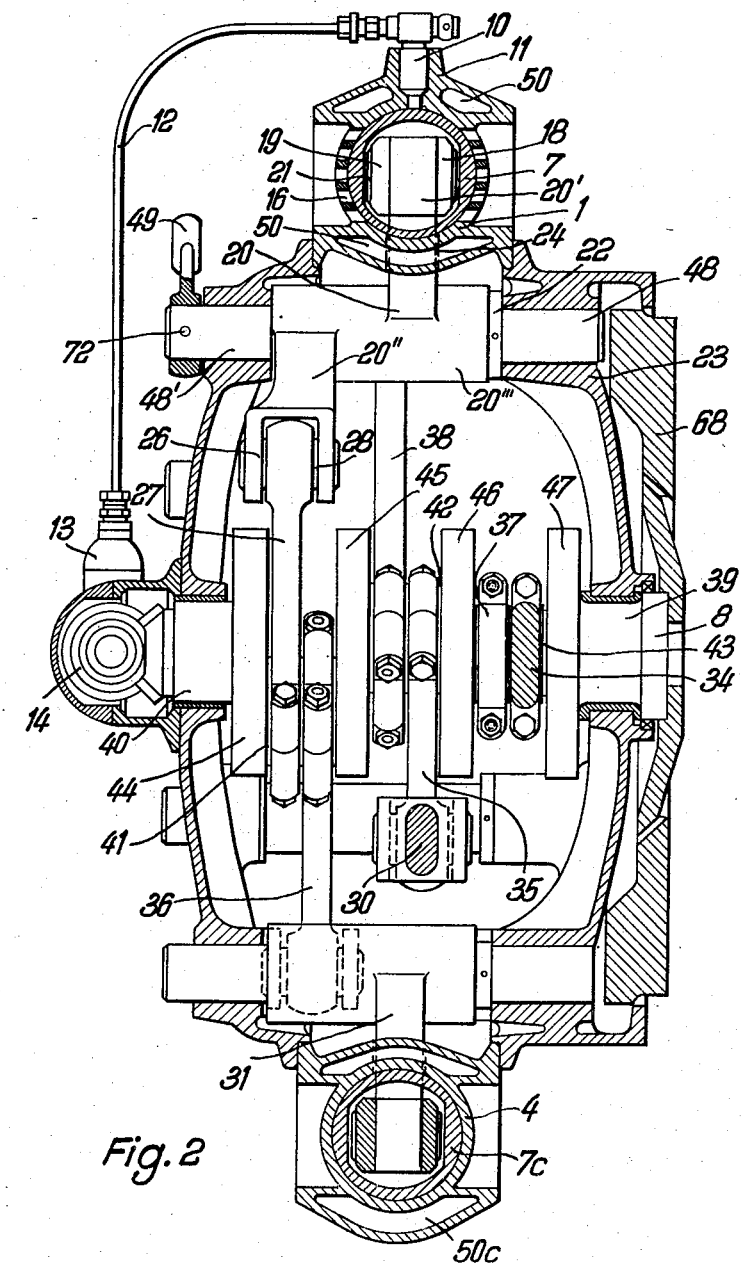
Fig. 2 is a section taken along the line II—II of Fig. 1.

Referring now to the drawings in detail, the polygon engine illustrated in Figs. 1 and 2 represents a hexagonal engine comprising the cylinders 1, 2, 3, 4, 5 and 6 respectively surrounded by cooling jackets 50, 50a, 50b, 50c, 50d and 50e. As will be evident from Fig. 1, each two adjacent cylinders of the engine meet along a corner of the hexagon formed by the cylinders. Each cylinder has respectively reciprocably mounted therein a double acting piston 7, 7a, 7b, 7c, 7d and 7e. At the polygon corners where the respective adjacent cylinders meet each other, the piston ends of each two adjacent pistons confine with each other and the adjacent cylinders with combustion chambers 9, 9a, 9b, 9c, 9d and 9e. Adjacent the corners of the hexagonal engine and in the latter there are provided bores 70, 70a, 70b, 70c, 70d and 70e respectively for receiving fuel injection means such as the fuel injection nozzle 10 (one only being shown in the drawings), which is connected to the engine in any convenient manner for instance by means of bolts 71 connected to flanges 11 (Fig. 3) of the respective cylinders. The arrangement of the fuel injection means at the combustion chambers may be effected in any convenient manner and is not limited to the particular showing in the drawings. The fuel injection means 10 communicate through conduit means 12 (see Fig. 2) with a fuel injection pump 13. If desired, instead of one fuel injection pump also a plurality of fuel injection pumps may be provided. The pump 13 is drivingly connected through the intervention of a transmission 14 with the centrally located crankshaft 8.

Each of the cylinders 1, 2, . . . 6 is provided with scavenging slots 15 and discharge slots 16, said slots being controlled by the respective piston 7, 7a, . . . 7e. Thus, with specific reference to the cylinders 1 and 6, it will be appreciated that when the pistons 7 and 7e occupy the position shown in Fig. 1, the scavenging air will enter through the scavenging slots 15 of cylinder 1 into the chamber 9e while the combustion gases will leave the chamber 9e through the discharging slots 16 so that a proper scavenging of the cylinder space between the adjacent portions of piston 7 and 7e will be obtained. Corresponding gas changing operations will occur in the other combustion chambers 9, 9a, . . . 9d. Each adjacent piston pair operates at a two-stroke cycle with regard to the respective cylinders pertaining thereto. Scavenging slots 15 and discharging slots 16 regularly follow each other in the polygon so that each working cylinder respectively representing one side of the polygon comprises inlet as well as outlet slots.

Two fishplates or links 18, 19 (Figs. 1 and 2) have one end thereof pivotally journalled in piston 7 of the cylinder 1 by means of the wrist pin 17. The other ends of said fishplates or links 18 and 19 are pivotally connected to a rocker arm 20 by means of a pivot or bolt 21. The rocker arm 20 comprises two arms 20' and 20" which are offset with regard to each other and are rigidly interconnected by a tubular portion 20''' through which extends a bolt 22 which is pivotally journalled in the casing 23. The bolt 22 is provided with two extensions 48, 48' which are eccentrically arranged with regard to the tubular portion 20'''. The extensions 48, 48' are rotatably journalled in the casing 23. The extension 48' protrudes from the casing 23 as is clearly evident from Fig. 2 and has connected thereto, for instance by a pin 72, a lever 49 which may be manually actuated. It is to be understood that the bolts on which the other rocker arms are journalled are similarly provided with adjusting levers 49. All of the levers 49 may, if so desired, be interconnected by a link system so that all levers 49 will be actuated together. Such an arrangement is shown in Fig. 6, according to which each lever 49 connected to the shaft extensions 48' is by means of a pivot 77 linked to an adjusting link 78. All of the said adjusting links 78 are by means of a pivot 79 linked to an adjusting ring 80 common to all of said links 78. It will thus be evident that, when turning the adjusting ring 80 about its central axis, all of the levers 49 will be adjusted through the respective links 78 linked thereto. The connection of all of the levers 49 with each other may also be effected by a gear system instead of a link system, in which instance each of the levers would be provided with a gear segment meshing with a gear of the gear system. It will thus be evident that tilting of the levers 49 brings about a rotation of the respective bolts 22. This rotation of the bolts 22 brings about a change in the position of the rocker arms 20, 29, 30, 31, 32 and 33 which in its turn brings about a change in the timing, i.e. the opening times of the inlet slots 15 and the outlet slots 16. By means of this arrangement, the degree of scavenging and also the charge for each cylinder can be varied in a simple manner for obtaining the most favorable results.

As will be seen from Figs. 1 and 2, the arm 20' of the rocker arm 20 extends through a window 24 in the cylinder 1 and also extends through a window 25 in the piston 7. The arm 20" has connected thereto a fork 26 in which one end of a connecting rod 27 is pivotally journalled by means of a bolt 28. The other end of the connecting rod 27 is journalled on the crankshaft 8 in a well known manner. The other pistons 7a, ... 7e are similarly connected with the crankshaft 8 through corresponding rocker arms 29, 30, 31, 32 and 33 respectively and connecting rods 34, 35, 36, 37 and 38 respectively.

As will also be evident from Fig. 2, the crankshaft 8 is rotatably journalled in the casing 23 by means of the pivots 39 and 40 and has connected thereto in any convenient manner a flywheel 68. The crankshaft 8 comprises four crank webs 44, 45, 46 and 47. The connecting rods 27 and 36 pertaining to the cylinders 1 and 4 respectively are journalled on the crank pin 41 between the crank webs 44 and 45. Similarly, the connecting rods 35 and 38 pertaining to the cylinders 3 and 6 respectively are journalled on the crank pin 42 between the crank webs 45 and 46. Finally the connecting rods 34 and 37 pertaining to the cylinders 2 and 5 respectively are journalled on the crank pin 43 between the crank webs 46 and 47. Inasmuch as the cylinders 1 to 6 are located in a common plane, it is necessary to crank or offset the arms of the rocker arms in such a way that a connection of the individual piston 7 through the fishplates 18 with the rocker arms 20, 29, 30, 31, 32 and 33 on one hand and a connection of these rocker arms with the connecting rods 27, 34, 35, 36, 37 and 38 on the other hand will be possible. This cranking has been described above in detail in connection with the arms 20' and 20" of the rocker arm 20.

Referring now to Fig. 3 showing the upper left-hand portion of Fig. 1 on an enlarged scale, it will be evident from this figure, that the distance from the plane 51, along which the cylinders 1 and 6 have been joined, to the adjacent edge of the scavenging slots 15 is shorter than the corresponding distance from the plane 51 to the adjacent edge of the discharge slots 16. In this way, an additional charging or supercharging can be obtained in a manner known per se.

As will also be evident from Fig. 3, a tie band 52 (only a portion of it being shown in Fig. 3) is passed around all of the cylinders making up the polygon so as firmly to hold the same together. The tie band 52 may be tightened by means of a screw 53 in the manner shown in Fig. 3. This will considerably simplify the assembly of the engine. Between the flanges 54 and 55 of the cylinders 1 and 6, a fitting pin 56 is provided. Similar fitting pins may be provided in the joints of the other cylinders.

Figs. 4 and 5 illustrate the possibility of controlling the discharge of the combustion gases by means of a valve. To this end, a valve cage is arranged between each two adjacent cylinders, and more particularly, according to the showing of Fig. 4, a valve cage 57 is inserted between the cylinders 1 and 6. A valve 58 is slidably mounted in the valve cage 57 which valve separates the combustion chamber 9 from the discharge passage 59 to which in customary manner there is connected the discharge manifold 73. The valve 58 is in the manner known per se closed by a spring 60 and is opened by a cam 62 forming part of a cam shaft 61. The cam shaft 61 is journalled in two supports 63 and 64 (Fig. 5) which are connected to and supported by the valve cage 57. As has been clearly shown in Fig. 5, the cam shaft 61 protrudes laterally beyond the support 64 and has keyed thereto a gear 65 which by means of a chain 66 is drivingly connected with the crank shaft 8 in any convenient manner (not shown). It is, of course, understood that the cam shaft may also be driven in any other known manner for instance by a pure gear transmission or by a vertical shaft. The valve control is covered by a hood 67. If the valve 58 is employed as discharge control member, not only the slots 15 (Fig. 3) but also the slots 16 may be employed as scavenging slots, i.e. as inlet slots so that the flow from both slot rows namely from the slots 15 and the slots 16 will be directed in the direction toward the discharge valve 58.

When scavenging with a discharge valve in the polygon corner, preferably also the opening start and closure of the cooperating slots of each two adjacent cylinders is effected at different times in order to be able to obtain a good scavenging efficiency with a minimum of air. Such an arrangement will increase not only the weight of the charge but also prevent an unnecessary drop of the values of condition or heat values of the exhaust gas so that an advantageous exploitation of these exhaust gases will be possible. While the opening and closing time of the respective cooperating slots by the pistons may be varied by individually adjusting the individual levers 49, it is also possible to interconnect those levers 49 which pertain to the two-arm levers 20 of each second piston when viewing the pistons in their sequence so that the slot control times by all of said second pistons can be jointly and uniformly adjusted. Such an arrangement is shown in Fig. 7. Similarly, the remaining levers 49 could be interconnected for selectively jointly controlling the slot control times of the remaining pistons.

The invention also comprises an arrangement according to which the valve 58 is employed as inlet valve and accordingly is connected to a device for supplying charging air. In such an instance both slots 15 and 16 would serve as discharge slots and would, of course, be connected with the discharge manifold. The construction per se as shown in Figs. 4 and 5 would otherwise be the same.

It is, of course, understood that the present invention is, by no means, limited to the particular construction and arrangements shown in the drawings but also comprises any modifications within the scope of the appended claims.

What I claim is:

1. In a piston type internal combustion engine: a plurality of cylinders defining with each other a polygon and corresponding in number to the sides of said polygon, each two adjacent cylinders communicating with each other at the respective polygon corner common thereto, a plurality of double acting pistons respectively reciprocably mounted in said cylinders, each two adjacent piston portions of each two adjacent pistons confining with each other and with the adjacent cylinder portions a compression chamber, and each of said cylinders being provided with inlet and outlet slots respectively arranged in its two compression chamber portions for admitting scavenging air into and discharging combustion gases therefrom, the inlet slots of each cylinder and the outlet slots of the respective adjacent cylinder being located in one and the same of said chambers and being controllable by the respective pistons for cooperating with each other during the scavenging operation, a crankshaft substantially centrally located with regard to the polygon confined by said cylinders, connecting means drivingly connecting each of said pistons with said crankshaft, and control means operatively connected to said connecting means and operable to vary the dead center position of said pistons to thereby vary the opening and closure time for the cooperating inlet and outlet slots with regard to each other so as to produce a supercharging of the cylinders with scavenging air.

2. In a piston type internal combustion engine having the shape of a polygon: a casing; a plurality of double acting reciprocable pistons; a crankshaft substantially coaxially located with regard to said polygon; and a plurality of connecting means respectively drivingly connecting said pistons with said crankshaft; each of said connecting means including a wrist pin mounted in the respective piston, a link having one end pivotally connected to said wrist pin, a two-arm lever tiltably journalled in said casing and having one arm pivotally connected to the other end of said link, and a connecting rod having one end pivotally connected to the other arm of said lever and having its other end pivotally connected to said crankshaft; said two-arm levers being adjustably journalled in said casing for selectively varying the location of their tilting axes.

3. In a piston type internal combustion engine having the shape of a polygon: a casing; a plurality of double acting reciprocable pistons; a crankshaft substantially coaxially located with regard to said polygon; a plurality of connecting means respectively drivingly connecting said pistons with said crankshaft; each of said connecting means including a wrist pin mounted in the respective piston, a link having one end pivotally connected to said wrist pin, a two-arm lever tiltably journalled in said casing and having one arm pivotally connected to the other end of said link, and a connecting rod having one end pivotally connected to the other arm of said lever and having its other end pivotally connected to said crankshaft; and a plurality of eccentric means adjustably journalled in said casing and respectively tiltably supporting said two-arm levers.

4. An internal combustion engine according to claim 3, which includes adjusting means common to all of said eccentric means and operatively connected thereto for jointly adjusting the same.

5. An internal combustion engine according to claim 3, which includes first adjusting means common to those eccentric means which pertain to the two-arm levers of each second double acting piston when sequentially progressing from one piston to the next piston for selectively jointly adjusting said last mentioned eccentric means, and second adjusting means common to the remaining eccentric means for selectively jointly adjusting the same.

6. In a piston type internal combustion engine of a polygonal shape: a plurality of cylinders corresponding in number to and arranged along the sides of a polygon, each two adjacent cylinders communicating with each other at the respective polygon corner common thereto, a plurality of double acting pistons respectively reciprocably mounted in said cylinders, each two adjacent piston portions of each two adjacent pistons confining with each other and with the adjacent cylinder portions a compression chamber, and each of said cylinders being provided with inlet and outlet slots respectively arranged in its two compression chamber portions for admitting scavenging air into and discharging combustion gases therefrom, the inlet slots of each cylinder and the outlet slots of the respective adjacent cylinder being located in one and the same of said chambers and being controllable by the respective pistons for cooperating with each other during the scavenging operation, a crankshaft substantially coaxially located with regard to the polygon confined by said cylinders, and connecting means drivingly connecting each of said pistons with said crankshaft, said connecting means connecting every second piston when progressing sequentially from one piston to the next piston in such a way as cause each second piston to open and close the respective slots controlled thereby at a time different from the time of opening and closing the slots controlled by the other pistons.

7. In a piston type internal combustion engine having the shape of a polygon: a plurality of double acting pistons; a crankshaft substantially centrally located with regard to said polygon; a plurality of connecting means respectively including a tiltable two-arm lever and drivingly connecting said pistons with said crankshaft; and means operatively connected with said two-arm levers for varying the tilting axes thereof.

References Cited in the file of this patent

UNITED STATES PATENTS

| 1,852,498 | Woolson | Apr. 4, 1932 |
| 2,305,310 | Hellweg | Dec. 15, 1942 |
| 2,413,957 | Daub | Jan. 7, 1947 |
| 2,484,516 | Lee | Oct. 11, 1949 |

FOREIGN PATENTS

| 117,684 | Great Britain | July 29, 1918 |